United States Patent [19]

Craig et al.

[11] Patent Number: 4,678,328
[45] Date of Patent: Jul. 7, 1987

[54] NON-OPTIMUM WAVEGUIDE OPTICAL SENSOR

[75] Inventors: Preston S. Craig; William F. Arendale, both of Huntsville, Ala.

[73] Assignee: United Technologies Corporation, Hartford, Conn.

[21] Appl. No.: 853,245

[22] Filed: Apr. 17, 1986

[51] Int. Cl.⁴ .................. G01B 11/26; G01C 3/00; H01J 5/16

[52] U.S. Cl. .................... 356/141; 250/227; 350/96.29; 356/1; 356/152

[58] Field of Search .............. 356/1, 141, 152; 250/227; 350/96.29

[56] References Cited

U.S. PATENT DOCUMENTS

| | | | |
|---|---|---|---|
| 3,152,317 | 10/1964 | Mayer | 356/1 |
| 3,329,818 | 7/1967 | Woehl | 356/152 |
| 3,352,223 | 11/1967 | Garra | 356/1 |
| 3,746,454 | 7/1973 | Pace et al. | 356/152 |
| 3,953,131 | 4/1976 | Britz et al. | 356/152 |
| 4,443,699 | 4/1984 | Keller | 250/227 |
| 4,514,084 | 4/1985 | Makimo et al. | 356/141 |
| 4,625,108 | 11/1986 | Nestel et al. | 356/152 |

Primary Examiner—Stephen C. Buczinski
Attorney, Agent, or Firm—Robert P. Sabath

[57] ABSTRACT

A novel optical sensor for measuring the separation of remote optical sources includes first and second optical fibers which are characterized by non-optimum optical waveguiding such that refractive index of optical fiber cores are selected to be less than that of the optical fiber cladding. Optical detectors receive only optical signals presented within the narrow acceptance angle of the optical fibers and provide equivalent electrical signals.

6 Claims, 5 Drawing Figures

NON-OPTIMUM WAVEGUIDE OPTICAL SENSOR

DESCRIPTION

1. Technical Field

This invention relates to optical sensors and in particular to optical sensors which employ non-optimum optical waveguides.

2. Background Art

To measure the separation between remote optical sources, optical sensors of the prior art most often comprise a focal plane array. These sensors are often characterized by light sensitve detectors arranged in a focal plane of the optical system. The most common example of a focal plane array is photographic film in a camera although other examples, such as a television vidicon, are similar. Light sensitive silver halide particles are contained in the film in a random matrix and act as discrete optical sensors. The film is positioned at the focal plane of the camera's lens to receive optical signals from remote sources.

The photosensitive elements which comprise focal plane arrays of the prior art possess numerical apertures such that their acceptance angles overlap. Consequently, in order to enhance the discrimination of the array, a means is often provided to increase the amount of light presented thereto or more finely subdivide the array. In a typical camera, the former function is provided by the lens and the latter by decreasing the grain size of the film's photosensitive particles.

Either technique improves the optical sensor's ability to image distant optical sources, and measure the separation therebetween in a precise manner, resulting in increased complexity and expense.

DISCLOSURE OF INVENTION

An object of the present invention is to provide an optical sensor for determining the separation between distant optical sources using non-optimum optical waveguides. Another object of the present invention is to provide an optical detection system having non-optimum optical waveguide sensors for measuring the separation between distant optical sources.

According to the present invention, a non-optimum waveguide optical sensor for measuring the separation between first and second optical sources emitting first and second optical signals includes an optical guide for selectively receiving the optical signals which comprises first and second non-optimum optical waveguides each having an inner core and an outer cladding. The core's refractive index is selected to be equal to or less than the cladding refractive index. The first and second non-optimum optical waveguides are positioned so as to form a known angle therebetween. Detectors are positioned with respect to the optical guide so as to receive the optical signals therefrom and to provide electrical signal equivalents thereof.

According to another aspect of the present invention, a non-optimum waveguide optical detection system for measuring the separation (S) between first and second optical sources remote from the system by a distance (D) emitting first and second optical signals includes an optical guide for selectively receiving the optical signals including a plurality of non-optimum optical waveguides. Each waveguide is disposed along an optic axis and has an inner core and an outer cladding. The refractive index of the inner core is selected to be less than the refractive index of the cladding. Each of the non-optimum optical waveguides are positioned so as to form a known angle therebetween. The optical detection system further includes a plurality of optical detectors each of which are positioned relative to a corresponding one of said non-optimum optical waveguides so as to receive the optical signals therefrom and for providing electrical signal equivalents thereof. Moreover, a signal processor receives the electrical signal equivalents as well as signals indicative of the distance (D) and the magnitude of said angle between each of said non-optimum optical waveguides and for providing therefrom signals indicative of the optical source separation.

BEST MODE FOR CARRYING OUT THE INVENTION

Figure 1:
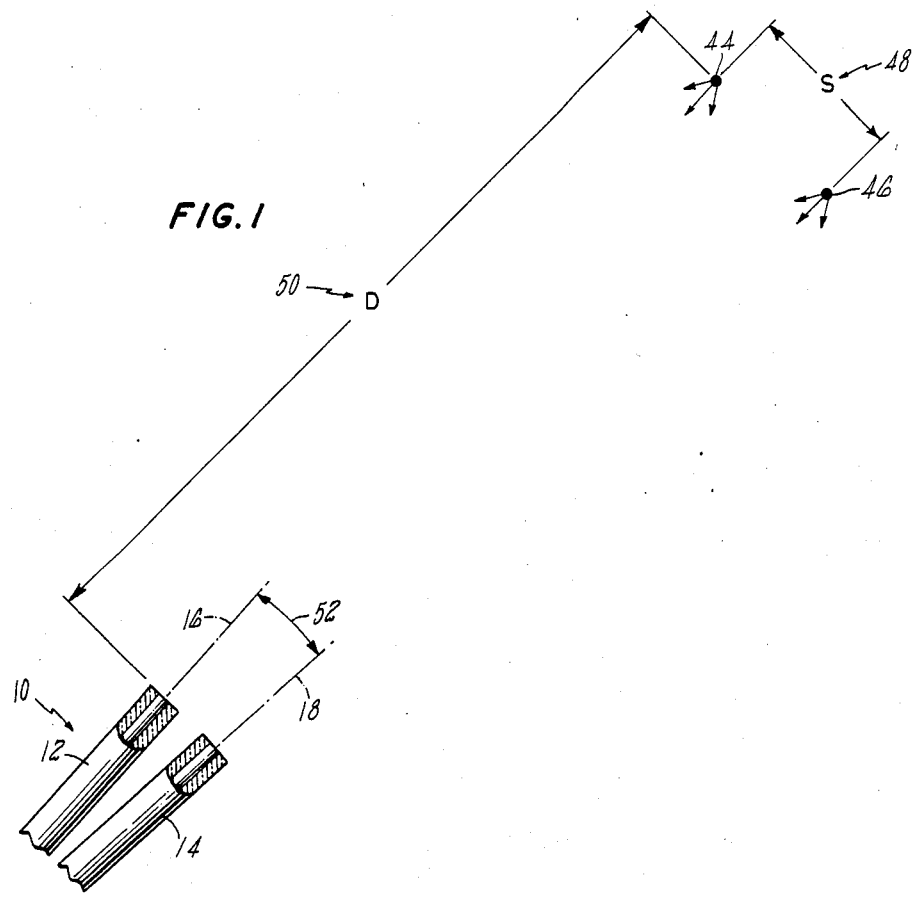
FIGS. 1 and 1A are illustrations partially in perspective and partially in section of a non-optimum waveguide optical sensor provided according to the present invention.

Referring first to FIG. 1, in an illustration partially in perspective and partially in section of a non-optimum waveguide optical sensor provided according to the present invention, a non-optimum waveguide optical sensor 10 includes first and second optical fibers 12 and 14 having optical axes 16 and 18, respectively. Each optical fiber is constructed so as to provide non-optimum waveguiding.

As is well known in the art, optical signals presented to the optical fibers will propagate along the optic axes. Most optical fibers are fabricated to possess optimum waveguiding characteristics, and are therefore constructed with an inner core having an index of refraction greater than an outer cladding.

Figure 1A:
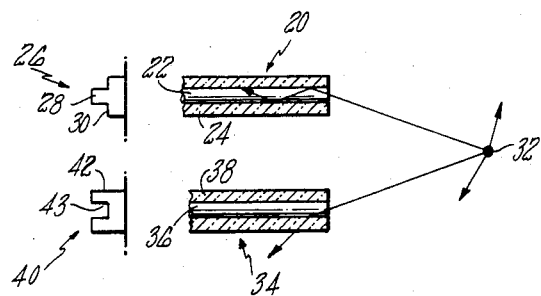

Referring now to FIG. 1A, a conventional optical fiber section 20 displays optimum waveguiding. The optical fiber comprises an inner core region 22 and outer cladding region 24. Diagram 26 of FIG. 1A shows the relative magnitudes between the refractive indices of the inner core (28) and outer cladding (30). Light source 32 provides an optical signal which enters the optical fiber and propagates therethrough. The ratio of core refractive index to the cladding refractive index determines the acceptance angle of the optical fiber. The larger the core to cladding refractive index ratio, the greater the angle from which optical signals are accepted.

An optical fiber constructed with non-optimum waveguiding is typified by optical fiber 34 also comprising an inner core 36 and outer cladding 38. Diagram 40 indicates the relative relationship between the indices of refraction of the cladding (42) when compared to inner core (43). For non-optimum waveguiding, the index of refraction of the cladding should exceed that of the core. An optical signal enters the optical fiber from approximately the same angle, is refracted away from the inner core, and subsequently leaves the fiber. Consequently, this optical fiber's field of view is substantially decreased over that of an optical fiber displaying optimum waveguiding. Only light presented to the optical fiber within a narrow acceptance angle will propagate therethrough. This very restricted field of view can be used to detect and measure the position of two or more optical signal sources remote from the sensor that are separated by very small distances or to determine the change of position of the sources during very small increments of time.

Referring again to FIG. 1, optical signal sources 44 and 46 are displaced from each other by a separation 48 (S). These sources are approximately equally remote from the optical sensor by a distance 50(D). In the best mode embodiment the non-optimum optical waveguiding optical fibers which comprise the sensor are positioned to be separated by an angle 52 whose magnitude is precisely known. Since both optical fibers are of the non-optimum waveguiding type, each fiber will receive optical signals only from that source which is approximately in direct alignment therewith.

Conventional triangulation techniques can be used to compute the magnitude of the separation between signal sources if the distance (D) separating the sensor and signal sources as well as the angle between optical fibers is known.

In the best mode embodiment the optical fibers comprise any glass or crystal transparent at the wavelength desired, wherein the index of refraction of the cladding is selected to be in the range 0.0001 less than or greater than the refractive index of the core. Those skilled in the art will note that the refractive index difference of approximately 0.0001 stems from practical consideration and that theoretically a core-cladding refractive index difference of 0.0000001 would be better. For fabrication, a bonding agent (not shown) is selected to have a refractive index closely matched to that of the waveguide.

The sensor also includes optical detectors, not shown in FIG. 1, which are of a conventional type and are selected to provide electrical signal equivalents of the optical signals presented thereto. These optical detectors are positioned by conventional techniques to receive optical signals from the optical fibers. In the best mode embodiment an optical detector is provided for each of the corresponding optical fibers.

For infrared optical signals the detectors comprise conventional photodetectors such as photodiodes or phototransistors selected to be sensitive at the wavelength of the optical signals.

Those skilled in the art will note that other non-optimum waveguiding means can be substituted for the non-optimum optical fibers described hereinabove with respect to the best mode embodiment. Alternate techniques include using optical waveguides with slightly tapered sections which receive the optical signals. If the fiber core has a viscosity less than the cladding then, under compression, the core achieves a convex shape (in cross section). In this configuration the convex, tapered fiber end acts as a lens to gather light over a larger numerical aperture. Subsequently, the surface of the tapered fiber end is ground flat or eroded by conventional techniques to obtain the desired optical discrimination.

Figure 2:
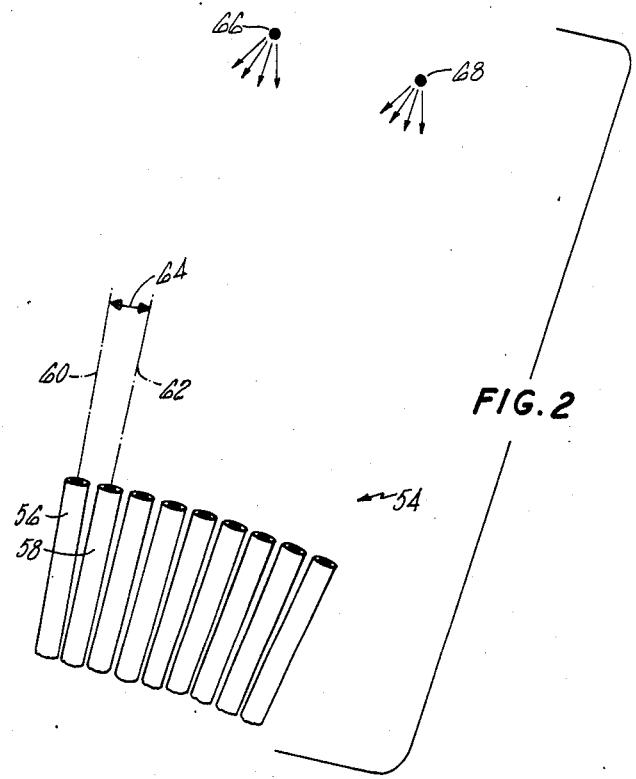
FIG. 2 is a drawing in perspective of a planar sensor array provided according to the present invention.

FIG. 2 is an illustration of a planar sensor array 54 provided according to the present invention. The sensor array comprises a plurality of non-optimum waveguide optical fibers of which fibers 56 and 58 are an example. These optical fibers possess the characteristics of those optical fibers described hereinabove with respect to FIG. 1. The optical fibers are bundled together by conventional methods such that the optic axes of each, such as axes 60 and 62, are configured to lie in a plane, and such that each fiber is displaced relative to the next by equal angle 64.

The planar optical sensor described with respect to FIG. 2 can be configured to measure the separation between a plurality of optical sources such as optical source 66 and 68 by using the triangulation techniques described hereinabove with respect to FIG. 1. In addition, the planar sensor array can be used to measure the change in position of a single optical source. If the distance to a signal source and the angle between each non-optimum optical fiber is known, then the separation between optical fiber acceptance angles is constant. Conventional signal processing apparatus and techniques, such as those described hereinbelow with respect to FIG. 4, can be employed in conjunction herewith to calculate the velocity or acceleration of the source as it moves across the field of view of the sensor array.

Those skilled in the art will also note that rectangular planar sensor arrays may be constructed using a plurality of rows or columns of planar sensor arrays which may be addressed in a conventional raster fashion and used to calculate the separation of optical sources or the relative movement thereof.

Figure 3:
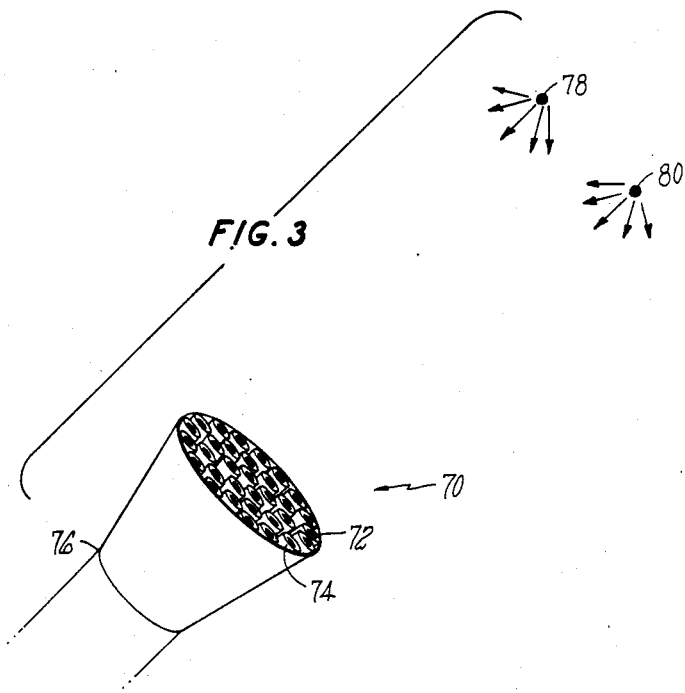
FIG. 3 is a perspective illustration of a solid angle optical sensor array provided according to the present invention.

FIG. 3 is a perspective illustration of a solid angle optical sensor array 70 provided according to the present invention. The solid angle optical sensor comprises a plurality of optical fibers of which fibers 72 and 74 are examples. These fibers are similar in construction to those described hereinabove and provide non-optimum waveguiding. The optical fibers may be bundled together at waist 76 by conventional techniques so that each fiber is displaced from those surrounding it by an equal solid angle. The solid angle optical sensor array can be used to determine relative movement or velocity of optical sources 78 and 80 which are located within the solid angle defined by the array using conventional techniques such as those defined hereinabove.

Figure 4:
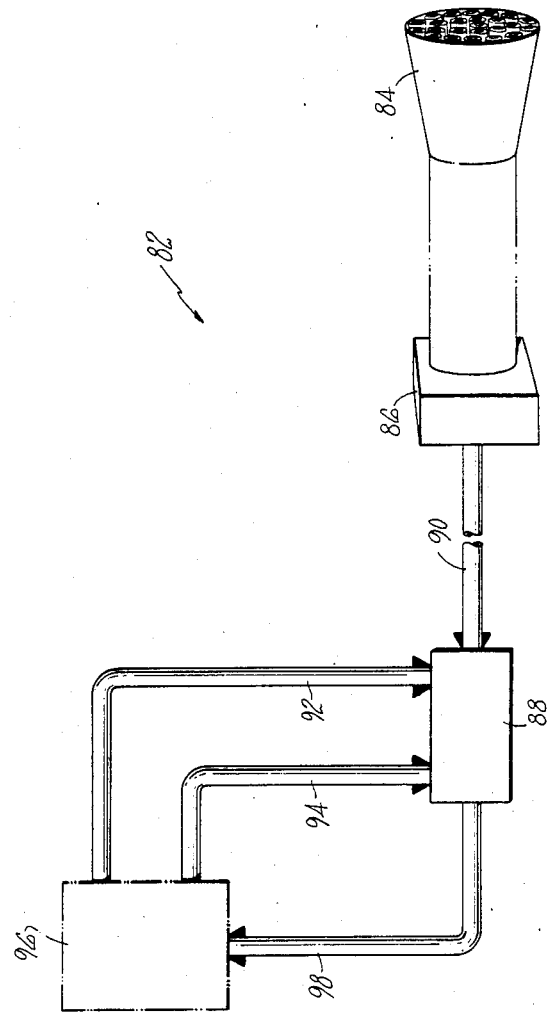
FIG. 4 is a schematic illustration of a non-optimum waveguide optical sensor system provided according to the present invention.

FIG. 4 is a schematic illustration of a non-optimum waveguide optical sensor system 82 provided according to the present invention. The system includes non-optimum waveguide optical sensor arrays such as solid angle array 84 which is of a type described hereinabove with respect to FIG. 3. The optical sensor array receives optical signals from distant optical signal sources which are received by selected optical fibers in the array. These signals propagate therethrough and are received by detector array 86 which is mounted by conventional techniques to the sensor array. The detector array comprises individual detectors which convert optical energy input thereto to electrical signal equivalents. The composition of the detectors is selected to be similar to that of those optical detectors described hereinabove with respect to the best mode.

Signal processor 88 receives signals from the detector array on lines 90, as well as signals on lines 92 and 94 indicative of the distance between the array and the optical sources (not shown), and the magnitude of the angle between optical fibers from external processor 96 which is not part of the present invention. The signal processor comprises a conventional digital computer of sufficient size to process the required number of signals in the time required by the application, and includes such amplifiers, converters and memory as is appropriate.

As indicated hereinabove with respect to FIG. 1, signals indicative of the separation between remote optical signal sources can be computed by conventional triangulation algorithms from the signals described hereinabove and provided on lines 98. Alternatively, the signal processor may compute signals indicative of the change in position or velocity, or acceleration of the optical signal sources by conventional techniques, including triangulation.

Although a digital signal processing means has been specified, those skilled in the art will recognize that alternative analog processors may be equivalently substituted.

Similarly, although the invention has been shown and described with respect to a best mode embodiment thereof, it should be understood by those skilled in the art that various other changes, omissions, and additions thereto may be made therein without departing from the spirit and scope of the invention.

We claim:

1. A non-optimum waveguide optical sensor for measuring the separation between first and second optical sources emitting first and second optical signals, comprising:
   optical guiding means for selectively receiving the optical signals including first and second non-optimum optical waveguides each disposed along an optic axis and each having an inner core guide means and an outer cladding means, said core guide means refractive index selected to be less than or equal to said cladding means refractive index, said first and second non-optimum optical waveguides positioned so as to form a known angle therebetween; and
   detector means positioned with respect to said optical guiding means so as to receive the optical signals therefrom and for providing electrical signal equivalents thereof.

2. A non-optimum waveguide optical detection system for measuring the separation (S) between first and second optical sources remote from the system by a distance (D) emitting first and second optical signals, comprising:
   an optical guiding means for selectively receiving the optical signals including a plurality of non-optimum optical waveguides, each disposed along an optic axis and each having an inner core guide means and an outer cladding means, said core guide means refractive index selected to be less than or equal to said cladding means refractive index, each of said non-optimum optical waveguide means positioned so as to form an angle therebetween;
   detection means including a plurality of optical detectors each positioned relative to a corresponding one of said non-optimum optical waveguides for receiving the optical signals therefrom and for providing electrical signal equivalent thereof; and
   signal processor means receiving said electrical signal equivalents and signals indicative of the distance (D) and the magnitude of said angle between each of said non-optimum optical waveguides and for providing therefrom signals indicative of the optical source separation.

3. The non-optimum waveguide optical sensor of claim 1, wherein each of said non-optimum optical waveguide means are approximately positioned in a plane defined by said optic axes and wherein each of said angles is approximately equal in magnitude.

4. The non-optimum waveguide optical sensor of claim 1, wherein each of said optical waveguide means are approximately positioned so that the axes thereof define a solid angle and wherein the solid angular displacement thereof is approximately equal in magnitude.

5. The non-optimum waveguide optical sensor of claim 1, wherein each of said non-optimum optical waveguides comprises an optical fiber.

6. The non-optimum waveguide optical detection system of claim 2 for measuring the change in position of an optical source, wherein said signal processor additionally provides signals indicative of the time elapsed between receipt of each of said optical signals by the corresponding one of said optical detectors.

* * * * *